United States Patent [19]

Hegemann

[11] Patent Number: 5,305,491

[45] Date of Patent: Apr. 26, 1994

[54] SELF ADJUSTING THREE-HEAD TOOTHBRUSH

[75] Inventor: Kenneth J. Hegemann, Carlsbad, Calif.

[73] Assignee: Benefit International Products, Ltd., George Town, Cayman Islands

[21] Appl. No.: 32,528

[22] Filed: Mar. 15, 1993

Related U.S. Application Data

[63] Continuation of Ser. No. 790,198, Nov. 7, 1991, abandoned.

[51] Int. Cl.⁵ .............................................. A46B 9/04
[52] U.S. Cl. .................................... 15/167.2; 15/201; 15/DIG. 5
[58] Field of Search ................. 15/167.2, 160, 201, 15/202, DIG. 5

[56] References Cited

U.S. PATENT DOCUMENTS

| D. 53,715 | 8/1919 | Samson . | |
|---|---|---|---|
| 1,110,406 | 9/1914 | Schreck | 15/201 |
| 1,908,509 | 5/1933 | Davis | 15/167.2 |
| 2,093,383 | 9/1937 | Rudof et al. | 15/167.2 |
| 3,022,814 | 2/1962 | Bodine, Jr. . | |
| 3,367,809 | 2/1968 | Soloff . | |
| 3,937,582 | 2/1976 | Del Bon . | |
| 4,326,902 | 4/1982 | Peddie . | |
| 4,387,479 | 6/1983 | Kigyos | 15/167.1 |
| 4,449,266 | 5/1984 | Northemann et al. | 15/167.2 |
| 4,536,694 | 8/1985 | McCarty et al. . | |
| 4,701,229 | 10/1987 | Arakawa et al. . | |
| 4,726,481 | 2/1988 | Hagan . | |
| 4,830,239 | 5/1989 | Tackles . | |
| 4,864,676 | 9/1989 | Schaiper | 15/201 |
| 4,869,277 | 9/1989 | Olsen | 15/167.1 |
| 4,876,157 | 10/1989 | Barman . | |
| 4,928,539 | 7/1990 | Barman | 300/21 |
| 5,114,214 | 5/1992 | Barman | 15/167.2 |
| 5,137,039 | 8/1992 | Klinkhammer | 132/308 |
| 5,148,567 | 9/1992 | Daub | 15/22.1 |
| 5,171,066 | 12/1992 | Klinkhammer | 300/21 |
| 5,221,123 | 6/1993 | Klinkhammer | 300/2 |
| 5,224,764 | 7/1993 | Klinkhammer | 300/21 |

FOREIGN PATENT DOCUMENTS

| 588348 | 5/1925 | France | 15/167.2 |
|---|---|---|---|
| 855253 | 5/1940 | France | 15/167.2 |
| 2618651 | 2/1989 | France | 15/167.2 |
| 2641680 | 7/1990 | France | 15/167.2 |
| 8901303 | 2/1989 | PCT Int'l Appl. | 15/167.2 |
| 104891 | 8/1938 | United Kingdom | 15/167.2 |
| 2192784 | 1/1988 | United Kingdom | 15/167.2 |

Primary Examiner—Stephen F. Gerrity
Assistant Examiner—Mark Spisich
Attorney, Agent, or Firm—Baker & Botts

[57] ABSTRACT

A toothbrush having three brush heads that self-adjust to maintain contact with the surfaces of the teeth and the gums. The three brush heads are independently attached to a single handle through elongated flexible arms and adjust independently to maintain contact with the surfaces of different size teeth and gums. The two brush heads whose bristles contact the sides of the teeth are slanted at a predetermined angle.

8 Claims, 3 Drawing Sheets

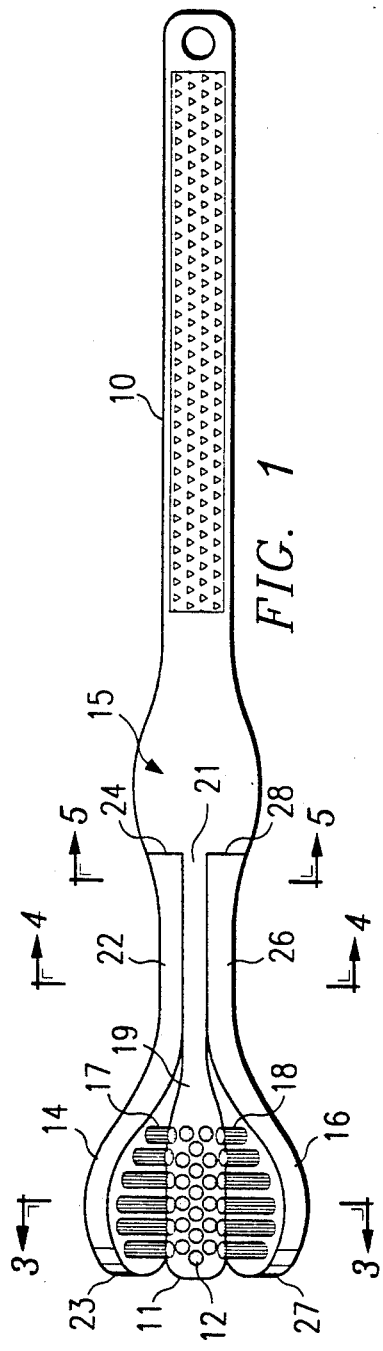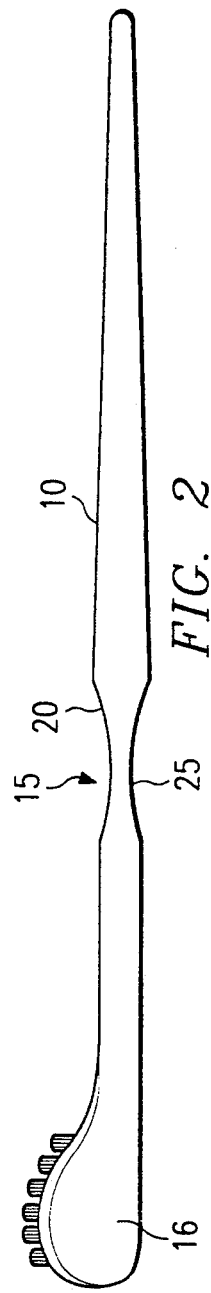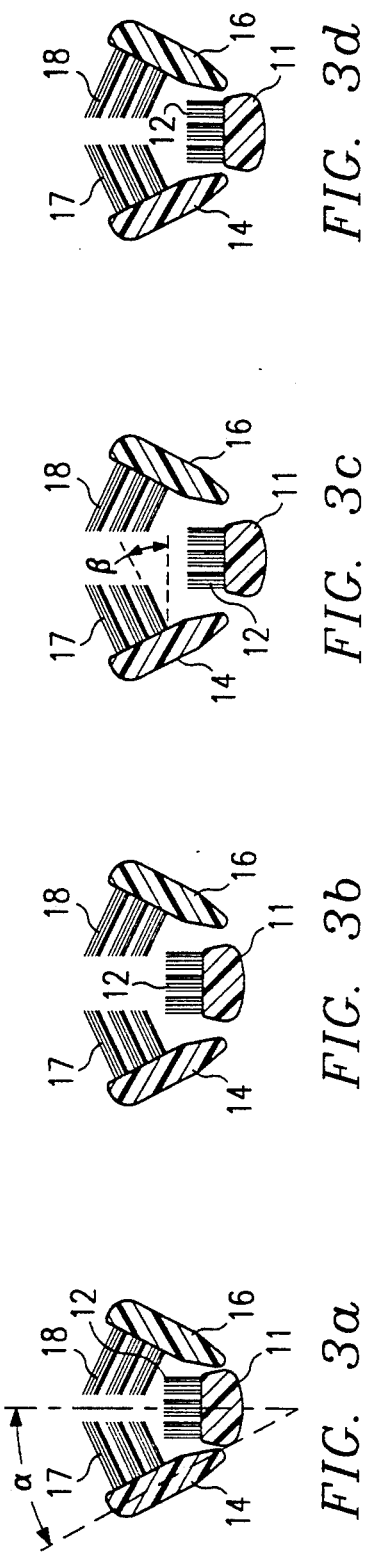

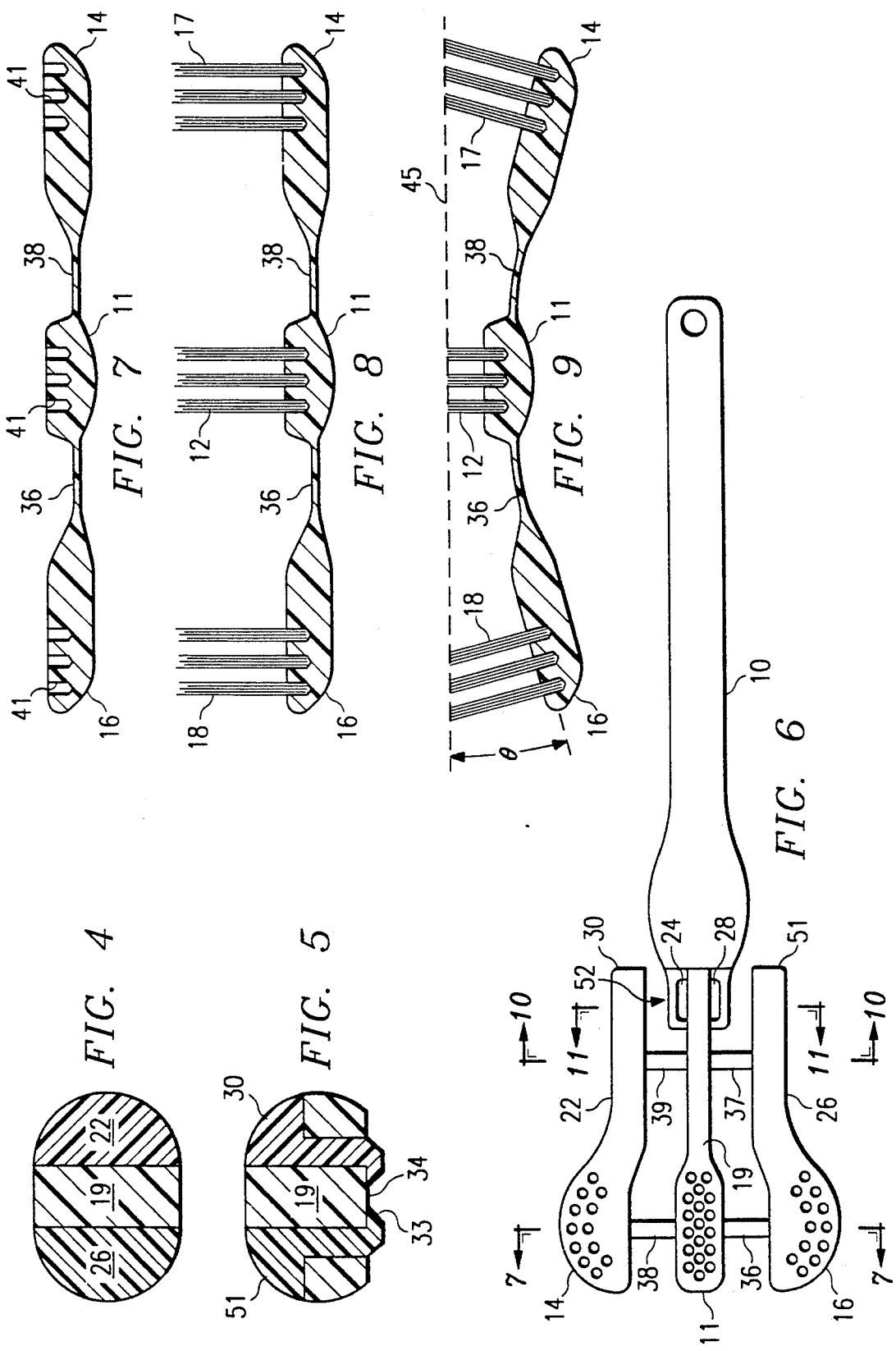

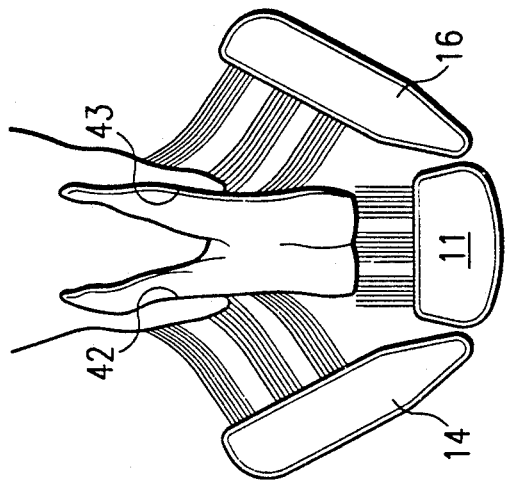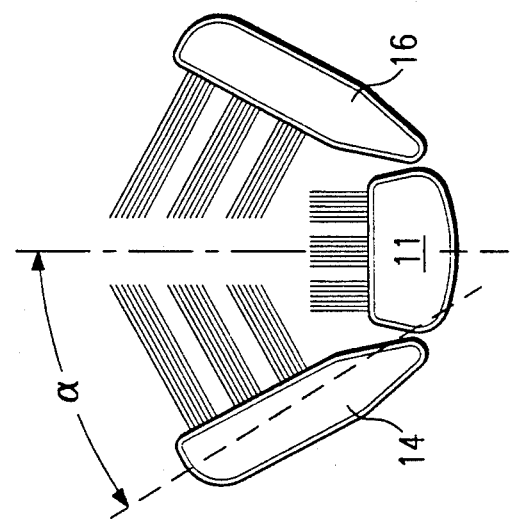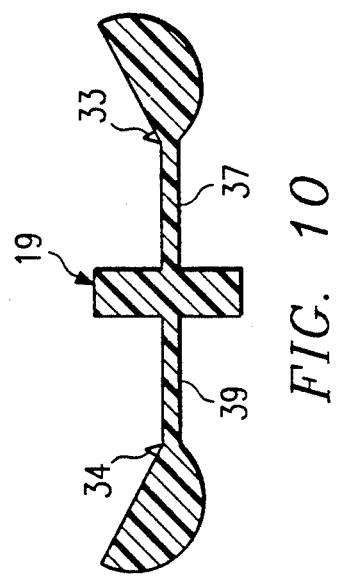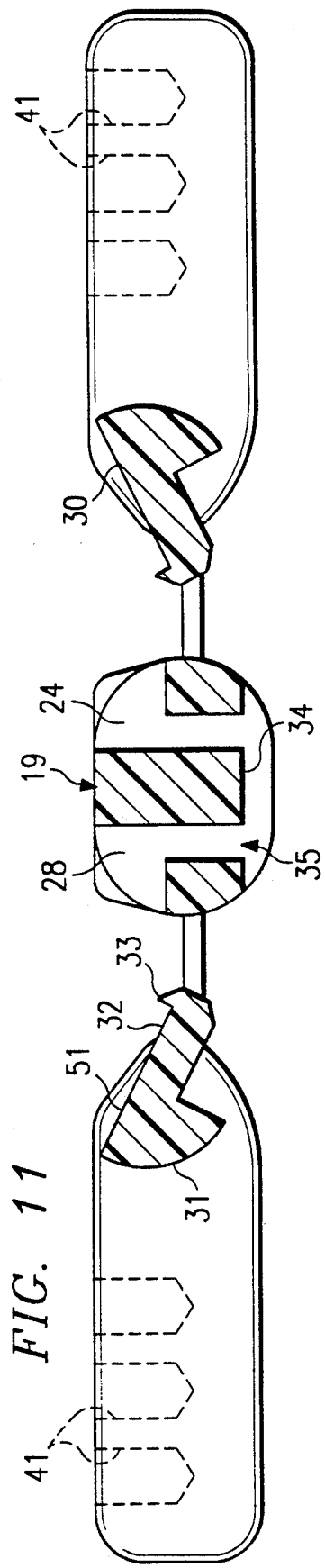

SELF ADJUSTING THREE-HEAD TOOTHBRUSH

This is a continuation of copending application Ser. No. 07/790,198 filed on Nov. 7, 1991, now abandoned.

BACKGROUND OF THE INVENTION

1. Field of the Invention

This invention relates to a self-adjusting three-sided toothbrush for simultaneously brushing the sides and ends of the teeth and portions of the gums, and more particularly to a toothbrush that has three brushes independently mounted to a handle which independently adjust to accommodate various tooth sizes and configurations and which effectively clean the teeth and sulcular pockets and massage the gums. This invention also relates to a method for manufacturing such three-sided brushes.

2. Description of Related Art

A number of prior art patents have recognized the desirability of cleaning simultaneously the sides and ends of the teeth. U.S. Pat. No. 2,588,601 issued to Zavagno on Mar. 11, 1952 entitled "Spring Pressed Toothbrush" discloses a toothbrush having bristles fixed conventionally to a handle for brushing the tops or bottoms of a tooth and including a plurality of U-shaped wire members extending through the end of the handle having a pair of brushes fixed to either end of the wire members for brushing the sides of the teeth. The wires are provided to allow for flexure, but may come in contact with parts of the mouth causing an uncomfortable feeling or even injury. Further, the amount of adjustability is limited due to the elastic limit of the springs working over such a short distance.

U.S. Pat. No. 2,214,407 issued to Deutsch on Sep. 10, 1940 entitled "Toothbrush with Brush-Head Made in Three Parts" discloses a toothbrush having three brush heads with bristles for brushing three sides of the tooth. The bristles on the sides are inclined upwardly. Similarly, U.S. Pat. No. 2,093,383 issued to Rudof et al on Sep. 14, 1937 and entitled "Tooth Brush" discloses a toothbrush with a U-shaped head having bristles on each side thereof for simultaneously brushing all sides of the tooth. The side bristles of Rudof are inclined downwardly towards the end bristles. Also, U.S. Pat. No. 2,701,380 issued to Ripper, on Feb. 8, 1955 and entitled "Attachment for Toothbrushes" discloses a U-shaped attachment which could be mounted to a conventional toothbrush to allow the toothbrush to clean the top and sides of the teeth simultaneously.

U.S. Pat. No. 2,807,820 issued to Dinhofer on Oct. 1, 1957 and entitled "Flexible Brush Head and Means to Retain it in a Predetermined Position" discloses a flexible brush head having inclined bristles which simultaneously brush both sides of the upper teeth and the top side of the lower teeth, and vice versa. U.S. Pat. No. 3,065,479 issued to McGee on Nov. 27, 1962 and entitled "Toothbrushes" discloses a U-shaped toothbrush having bristles on three sides to brush the tops and sides of teeth simultaneously. U.S. Pat. No. 2,244,615 issued to Garcin on Jun. 3, 1941 and entitled "Toothbrush" also discloses a toothbrush head having bristles formed to brush a tooth on three sides.

U.S. Pat. No. 4,115,894 issued to Peterson on Sep. 26, 1978 and entitled "Toothbrush for Simultaneous—Surface and Sulcus Cleaning" discloses a toothbrush having a plurality of bristles oriented for cleaning of surface areas of more than one tooth surface and sulcus simultaneously. U.S. Pat. No. 4,972,542 issued to Moshos et al. and entitled "Toothbrush Apparatus" discloses a toothbrush head which is secured to a brush head containing a pair of side brushes for brushing the sides of the tooth.

All of the foregoing prior art toothbrushes have some or all of the following limitations or disadvantages: 1) each of the side and end brushes are not moveable independently of one another, 2) the toothbrushes are bulky and have protrusions or wires which might catch or cause discomfort to areas inside the mouth, 3) they are expensive to manufacture and do not use conventional manufacturing processes and machines, and 4) they have inadequate flexure for teeth of varying configurations. Prior art devices which do not allow for sufficient flexure result in the bristles bending too much causing them to wear out prematurely. Such wear results in inadequate cleaning and damage to gum tissue.

SUMMARY OF THE INVENTION

The method of brushing teeth which is most widely recommended by dental professionals is known as the "Bass Technique". In simple terms, the user is instructed to hold a conventional toothbrush at approximately a 45 degree angle with one-half the bristles touching the teeth and the other half of the bristles touching the gums. The user is instructed to make short back and forth strokes, not up and down as instructed years ago.

This method of brushing allows the enamel surface to be cleaned while also providing the vital gum massage activity which promotes healthy gum tissue. It also allows bristles to enter and clean the sulcus, or sulcular pocket, which is the tooth surface which is hidden behind the gum tissue. Gum massage and sulcus cleaning are absolutely mandatory to prevent periodontitis which now affects 75 to 100 million Americans. Even though the Bass Technique is taught by thousands of dentists to their patients, few follow the instructions. The method is too time consuming and difficult. Manual skill and dexterity are required when using a conventional toothbrush in order to obtain effective results and most patients (evidenced by high incidence of gum disease) are simply not capable of utilizing a conventional toothbrush properly.

The present invention relates new and novel toothbrush which reduces or eliminates the human error factor. The toothbrush of this invention is self-adjusting to conform to various tooth sizes and configurations encountered within the oral cavity. Further, the toothbrush of this invention has the adjustability to accommodate various lengths of teeth within the oral cavity. The bristles of the toothbrush of this invention utilize nylon bristles which can be end rounded and polished so as to avoid abrasion to the enamel surfaces and scar damage to the gum tissue. Further, toothbrushes of this invention can be manufactured using conventional toothbrush manufacturing machinery, and thus be economically manufactured. The toothbrush of this invention includes two side brush heads and a central brush head each having an elongated arm. The end of each arm is independently mounted or connected to a common location on a handle. The three brush heads operate independently of one another. The two side brush heads have bristles which are longer than the central brush head which brushes the ends of the tooth. The side brushes have an angle of attack of from 15 degrees to 40 degrees to permit the bristles to enter and clean the sulcular pocket. The three brush heads toothbrush can easily be moved back and forth on the teeth and cleans the end, sides and sulcular pockets of each tooth adjusting automatically to the length and width of the tooth as the toothbrush is moved. No practice or training is required to use it and effective cleaning is possible with little effort and only a short period of use.

A preferred embodiment of the adjustable toothbrush employs three brush heads having an elongated arm extending along its longitudinal axis. The three brush heads are formed in a substantially U-shape with their elongated arms being parallel to one another. The arms are joined at their ends to a handle. The brush heads are positioned such that the bristles of the side brush heads form an angle of between 15 to 40 degrees, and most preferably about 27 degrees, to permit the side bristles to enter and clean the sulcular pocket. Each of the three brush heads is movable independently of the other brush heads. Thus, the side brush heads can move apart for wider teeth and move together for narrower teeth, and the central brush head moves up and down as the length of the teeth changes. Because of the relatively long arm attached to each brush head, even though the brush head moves, the angle of attack of the bristles of the side brush heads remains relatively constant. The brush heads are smooth and compact so they will not catch or cause discomfort to any surfaces inside the mouth. The ends of the arms of the side brush heads have fittings molded at the end thereof which allow them to be snap fitted into the end of the handle. Numerous other arrangements however, could be utilized to connect the ends of the arms of all three brush heads to the handle.

The method of manufacture of the present invention utilizes a molding process in which all three brush heads and the handle are molded in a single piece with the side brush heads positioned flat on each side of the central brush head. The two side brush heads are connected to the central brush head with runners which hold the parts together in precise locations relative to each other before moving the molded unit through the various steps of manufacture. The toothbrush goes into a conventional tufting machine in a flat position and bristles are pushed into holes formed in all three brush heads. The next step is to trim the bristles to the correct length. At the trimming station, the two side brush heads are held at a predetermined angle to the central brush head and the bristles are trimmed in a straight line as though the toothbrush was a conventional brush. However, because the side brush heads are bent or held away from the central brush head, the side brush heads each have longer bristles than the central brush head and the ends of the side brush head bristles are cut at an angle.

The length of bristle trim is one of the primary factors effecting bristle stiffness i.e., soft, medium or firm. The longer the trim, the softer the bristles. The shorter the trim, the firmer the bristles. Bristle diameter also affects stiffness. Dental professionals desire that soft bristles have contact with the gums and that somewhat firmer bristles have contact with the enamel surfaces. The trim and structure of the present invention gives dental professionals exactly what they want in both locations. Here the central brush head has shorter, firmer bristles which contact only the enamel surface of the teeth while the side brush heads have longer, softer bristles which make contact with the gums and enter the sulcular pocket. Further, it is to be noted that the side brush heads have longer bristles which contact the gums and shorter bristles which contact the teeth due to the angle at which the bristles are trimmed.

Returning now to the method of manufacture, the bristles are then end rounded and polished. During this procedure, the two side brush heads are again held at the same predetermined angle to the central brush head to maintain all of the ends of the bristles in flat plane. Next, the brush heads are separated by shearing off the runners connecting each brush head to the adjacent brush head. The separated side brush heads can now be connected to the handle. A preferred connection is to form the ends of the side brush heads in such a configuration that each can be snap fitted into the handle. Many other methods of connecting the three brush heads can be used, such as adhesive bonding, press pins, clamps, sleeves, etc. The important thing is that the brushes be connected at some distance away from the bristle section to allow the three brushes sufficient flexure to independently float and adjust to various tooth configurations. The method of connection desirably is such that it does not create any obstructions which could catch on the inside of the mouth.

Further aspects of the present invention will become apparent from the following detailed description when considered in conjunction with the accompanying drawings. It should be understood, however, that the detailed description and the specific examples, while representing the preferred embodiment are given by way of illustration only.

BRIEF DESCRIPTION OF THE DRAWINGS

FIG. 1 is a plan view of the adjustable toothbrush which is the subject of this invention.

FIG. 2 is the side view of the toothbrush shown in FIG. 1.

FIGS. 3a, b, c and d are cross-sectional views taken along line 3—3 of FIG. 1 illustrating various positions of the side brush heads relative to the central brush head.

FIG. 4 is a cross-sectional view taken along line 4—4 of FIG. 1.

FIG. 5 is a cross-sectional view taken along line 5—5 of FIG. 1 illustrating the snap fit interlocking relationship of the arms of the side brush heads to the handle.

FIG. 6 is a plan view illustrating the manner in which the toothbrush of this invention is molded.

FIG. 7 is a cross-sectional view taken along line 7—7 of FIG. 6 illustrating the cross-section of the side and central brush heads after molding.

FIG. 8 is the cross-sectional view of the brush heads shown in FIG. 7 after tufting.

FIG. 9 is the cross-sectional view of the brush heads of FIG. 8 after the bristles are trimmed and polished.

FIG. 10 is a cross-sectional view taken along 10—10 of FIG. 6.

FIG. 11 is a cross-sectional view taken along 11—11 of FIG. 6.

FIG. 12 is an enlarged end view illustrating the three brush heads in their normal position prior to brushing.

FIG. 13 is an enlarged end view illustrating the side brush heads with the side bristles contacting both the enamel and the sulcular pocket of the gums and the central brush contacting the end enameled portion of a tooth.

DETAILED DESCRIPTION OF THE INVENTION

The following description is of the best presently contemplated modes of carrying out the invention. This description is made for the purpose of illustrating the general principles of the invention and should not be taken in a limiting sense.

In accordance with the present invention, FIGS. 1 and 2 show an adjustable toothbrush having a handle 10, a central brush head 11 having tufts of bristles 12 therein, and two side brush heads 14 and 16 having tufts of bristles 17 and 18, respectively. The central brush head 11 includes a narrow elongated arm 19 which is connected to the handle 10 at 21. The arm 19 is preferably formed integrally with the handle 10. The arm 19 is substantially narrower than the width of the handle 10 and can flex in a plane perpendicular to the plane of the handle to accommodate teeth of varying lengths as the toothbrush is used. The central brush head 11 is molded with a plurality of recesses or holes 41 for receiving the bristles 12 to form tufts in a conventional manner.

The side brush head 14 includes an elongated arm 22 and an enlarged head portion 23 which is formed with recesses or holes 41 to receive the bristles 17 to form tufts. The arm 22 is connected to the handle 10 at 24 as more fully described hereinafter. Similarly, side brush head 16 has an elongated arm 26 and an enlarged head portion 27 which has recesses or holes 41 formed therein for receiving the bristles 18. The end of the arm 26 is connected to the handle 10 at 28 as more fully described hereinafter. The brush heads 11, 14 and 16 are not connected to each other anywhere along their lengths except at 21, 24 and 28. Consequently, the brush heads move independently relative to each other so that they can accommodate various lengths of teeth and various widths and sizes of teeth. The handle 10 has an expanded portion 15 with depressions 20 and 25 formed on the top and bottom thereof for receiving the thumb and index finger of a user. Holding the brush in this manner facilitates manipulation of the toothbrush.

Referring to FIGS. 3a, 3b, 3c and 3d, there are shown, end views of each of the brush heads. Referring specifically to FIG. 3a, it can be seen that the central brush head 11 has bristles 12 which are trimmed straight across the top. It is to be noted that the bristles 12 are shorter and thus firmer than the bristles on the side brush heads 14 and 16. The reason for this is that dental professionals prefer that firmer bristles be used against the enamel portions of the tooth, but that more flexible bristles be used in that part of the toothbrush that contacts the soft tissue of the gums. The side brush head 14 has bristles 17 which are longer than the bristles 12 of central brush head 11. The bristles 17 are also cut at an angle to the plane of the side brush head 14 as illustrated by the angle α shown in FIG. 3a. The angle α is the angle between the plane in which the side brush head 14 lies and the plane perpendicular to the central brush head 11. Ideally, this angle is between about 15° to 40° and preferably is about 27°. It is apparent that if the angle α is closer to 15°, the bristles 17 and 18 will be cut shorter. Conversely, when the angle α is closer to 40°, the bristles 17 and 18 will be cut longer. The structure of side brush head 16 is the same as described for side brush head 14. This angle α is preferably selected to give close to a 45° angle of attack when being used. It has been found that when the angle is about 27°, the bristles bend against the teeth and gums such that the angle of attack (see angle β in FIG. 3c) is about 45°.

FIG. 3b shows the side brush heads 14 and 16 being urged apart as though a tooth were between the bristles 17 and 18 with the central brush head 11 remaining in the same position as it was in FIG. 3a. FIG. 3c shows the side brush heads 14 and 16 remaining in the same position as shown in FIG. 3b with the central brush head 11 being biased downwardly. FIG. 3d shows the side brush heads 14 and 16 in the same position as shown in FIG. 3a with the central brush head 11 being biased downwardly. It can be seen from all of these views that each brush head moves independently from one another to accommodate teeth of various widths and lengths. It is also apparent that side brush heads 14 and 16 move independently of one another. Further, it can be seen that the angle of attack of the bristles, which is shown as the angle β in FIG. 3c remains substantially constant notwithstanding the width of the tooth being cleaned or the spacing between the bristles 17 and 18. The angle of attack increases when the bristles contact the teeth and gums (see FIG. 13), and preferably approaches 45° which is believed optimum.

Referring now to FIG. 4, there is shown a cross-sectional view taken along line 4—4 FIG. 1. The elongated arm 19 of the central brush head 11 has positioned on either side thereof the elongated arms 22 and 26 of the side brush heads 14 and 16 respectively. The arms are not connected at this point and arms 26 and 22 can each move away from arm 19.

Referring now to FIGS. 6, 7, 10 and 11, the handle 10 has an end generally designated as 52 which has formed therein two recesses 28 and 24. The end 51 of arm 26 is shaped complementary to the shape of the recess 28. Likewise, the end 30 of the arm 22 is shaped complementary to the shape of the recess 24. The end 51 as shown in FIG. 11 includes a pie shaped portion 31 integrally formed with an elongated portion 32 which has a projection 33 formed on the end thereof. In assembling the toothbrush which will be described more fully hereinafter, the end 51 of the arm 26 is positioned over the recess 28 in the handle 10 and the downwardly extending portion 32 is inserted therein. The plastic is flexible enough to allow the projection 33 to move through the smaller passage 35 of the recess 28 and lock against the bottom 34 of the arm 19. The locking engagement can be clearly seen in FIG. 5. Thus, the snap fit of the ends 51 and 30 of the side brush heads 16 and 14 respectively, into the handle 10 connects each of the side brush heads to the handle independently and allows the side brush heads 14 and 16 to move independently and relative to each other and to central brush head 11. While only the locking engagement of end 51 of side brush head 16 was described above, it is apparent that the end 30 of side brush head 14 is the mirror image of end 51 and the locking engagement of end 30 of side brush head 14 into recess 24 is the same for each side brush head.

Referring to FIGS. 6 and 7, there is shown a plan view of the subject three-sided toothbrush to illustrate the method of manufacture. A conventional mold is prepared to manufacture the toothbrush in substantially a single plane. The handle 10 is integrally formed with central brush head 12 and arm 19. The end 52 of the handle 10 is formed as previously described in connection with FIGS. 6 and 11 to form the recesses 28 and 24 which allow the ends 51 and 30 to lock into the handle to form the fulcrum for the pivotal and adjustable motion desired for the brush heads. As shown in FIGS. 6 and 7, all three brush heads are molded in a flat or planar position. The side brush head 16 is connected to the central brush head 12 by runners 36 and 37. The side brush head 14 is connected to the central brush head 12 by runners 38 and 39. The runners 36, 37, 38, and 39 hold the brush heads together and in precise location relative to each other so that they maintain this relationship as the toothbrush moves through the various steps of manufacture.

After the molding step is accomplished as shown in FIG. 7, the toothbrush goes into a conventional tufting machine (not shown) in a flat position. Each of the brush heads has a plurality of holes or recesses 41 formed therein during the molding process. The tufting machine recognizes a standard flat brush and inserts and locks a bundle of bristles into each preformed hole 41 in a conventional manner.

In the conventional method of tufting a toothbrush, a handle blank is provided with a number of precored holes each of which will subsequently receive a bristle tuft. The handle blank is positioned in a tufting machine under a tufting head. A picker counts and grabs a predetermined number of bristles and transfers that bundle of bristles to a position directly over and transverse to the precored hole. A small metal anchor which is slightly longer than the diameter of the precored hole is positioned transversely over the bristle bundle at its midpoint. A driver mechanism moves downward, contacts the metal anchor, pushes the metal anchor against the top of the bristle bundle, moves the bristle bundle downwardly to fold the bristle bundle in half and guides it as the driver mechanism continues driving the folded bristle bundle and anchor into the hole. As the driver mechanism continues downwardly, the metal anchor cuts the edges of the plastic on both sides of the hole and is buried below the surface of the handle blank. Both ends of the bristle bundle are now positioned adjacent to one another and form a U-shaped tuft which is locked into the blank by the anchor. Conventional tufting machines have been perfected to a level in which they can tuft over 700 holes per minute as described above. This allows toothbrushes to be produced at high automated speeds and very low costs. Any deviation from the standard techniques of tufting a toothbrush will result in significantly increased costs.

The three-sided toothbrush which is the subject of this invention allows the use of a standard tufting machine as though it were a conventional toothbrush. Accordingly, all the tufting machine sees is a plurality of brush heads having pre-formed holes which allow bristles to be inserted and locked into the holes. Similarly, conventional machines which trim all bristles flat across the top can be used in the novel method of manufacture of the subject invention.

The next step in the method of manufacture is to trim the bristles to the desired length. It can be seen from FIG. 7 how the three brush heads 11, 14 and 16 lie in substantially the same plane when molded. After tufting, the cross-sectional view of the brush heads is shown in FIG. 8. In order to cut the bristles to the desired length, the two side brush heads 14 and 16 are clamped or held down at a predetermined angle $\theta$ as shown in FIG. 9 to allow the trimming to occur in a straight line as illustrated by line 45. The trimming machine merely looks at the subject toothbrush as though it were a standard brush with the objective being to trim the bristles flat. The runners 36, 37, 38, and 39 are thin and flexible and provide little resistance to moving the side brush heads downwardly to the proper angle. It is to be further noted that because of the angle at which the side brush heads 14 and 16 are held relative to the central brush head 11, the ends of the bristles 17 on brush head 14 and the ends of bristles 18 on brush head 16 are cut at an angle.

The next step in the method of manufacture is to round and polish the ends of the bristles. In this step, the two side brush heads are again held down at the same predetermined angle to allow the rounding and polishing machine to treat the bristles as though it were a conventional toothbrush having bristles of equal length. While rounding and polishing is preferred, this step may be omitted, if desired. After the polishing of the bristles, the runners 36, 37, 38, and 39 are removed by either a manual or an automated method and the three brush heads are ready for final assembly.

The next step in the method of manufacture is to connect the three brush heads. Numerous methods of connecting the ends of the three brush heads at a common point to the handle can be employed. For example, the ends can be bonded together, they can be pinned together, they can be clamped together, or a sleeve can be wrapped around the three brush heads to hold them together. The preferred embodiment is shown herein which utilizes the specially formed ends 51 and 30 of each side brush head 16 and 14 to snap fit into the recesses 28 and 24 formed in the end of the handle as described previously. This facilitates assembly by not requiring any additional materials for connection. The side brush heads 14 and 16 can either be connected to the handle 10 manually or automatically by machine. The snap fit of the ends 51 and 30 of the side brush heads 16 and 14 into the recesses 28 and 24 of the handle 10 allows the three brushes to independently float and adjust to various tooth configurations and sizes at a point remote from the fulcrum or connecting point of the ends of the brush heads.

Further, the angle of the two side brush heads, which is the angle $\alpha$ shown in FIGS. 3A and 12, is within the range of 15 to 40 degrees, but is most desirably around 27 degrees. This permits the ends of the bristles to easily enter and clean the sulcular pockets shown as 42 and 43 in FIG. 13. The ability of this toothbrush to clean the sulcular pockets of each tooth, including the inside of the back teeth which are very difficult to get to by manual manipulation of a conventional toothbrush, will assist most users in proper brushing with a relatively simple back and forth motion. The use of the subject toothbrush permits the simultaneous brushing and cleaning of both the sides of each tooth as well as the gums and sulcular pockets and cleaning the ends of each tooth as well. The use of the subject toothbrush could have a significant effect with respect to diminishing gum disease.

Although the present invention has now been described in terms of certain preferred embodiments and exemplified with respect thereto, one skilled in the art will readily appreciate that various modifications, changes, omissions and substitutions may be made without departing from the spirit thereof. It is intended therefore that the present invention be limited solely by the scope of the following claims.

I claim:

1. A self-adjusting three-head toothbrush comprising:
   (a) a handle having a connecting end;
   (b) a central brush head having (i) a central brush head portion having a plurality of recesses formed therein for receiving tufts of bristles, (ii) tufts of bristles, each tuft having an anchor fixed in the recesses of the central brush head portion and bristle ends lying in a plane substantially parallel to the central brush head portion, and (iii) an elongated arm extending longitudinally from said central brush head portion and terminating in a connecting end;

(c) a first side brush head having (i) a first side brush enlarged head portion having a plurality of recesses formed therein for receiving tufts of bristles, (ii) tufts of bristles, each tuft having an anchor fixed in the recesses of the first side brush enlarged head portion and bristle ends, and (iii) an elongated arm extending longitudinally from said first side brush enlarged head portion and terminating in a connecting end;

(d) a second side brush head having (i) a second side brush enlarged head portion having a plurality of recesses formed therein for receiving tufts of bristles, (ii) tufts of bristles, each tuft having an anchor fixed in the recesses of the second side brush enlarged head portion and bristle ends, and (iii) an elongated arm extending longitudinally from said second side brush enlarged head portion and terminating in a connecting end;

wherein (i) said first side brush head and said second side brush head are positioned on opposite sides of said central brush head, (ii) said connecting end of the elongated arm of the central brush head is integrally connected to the connecting end of the handle, (iii) said connecting end of the elongated arm of the first side brush head and said connecting end of the elongated arm of the second side brush head are both connected to the connecting end of the handle on opposite sides of the elongated arm of the central brush head, (iv) the elongated arms of the first side brush head and the second side brush head lie parallel to and against opposite sides of the elongated arm of the central brush head, and (v) said bristle ends of the first side brush head and said bristle ends of the second side brush head lie in a plane substantially perpendicular to the plane of the bristle ends of the central brush head.

2. A toothbrush in accordance with claim 1 wherein the first side brush enlarged head portion and the second side brush enlarged head portion are both positioned at a predetermined angle with respect to the central brush head portion, said predetermined angle being the acute angle between (i) a plane perpendicular to the plane of the bristle ends of the central brush head and (ii) a plane parallel to the respective first side brush enlarged head portion or second side brush enlarged head portion, wherein said predetermined angle is within the range of 15 to 40 degrees.

3. A toothbrush in accordance with claim 2 wherein the predetermined angle is about 27 degrees.

4. A toothbrush in accordance with claim 1 wherein the tufts of bristles in the first side brush head and in the second side brush head are longer than the tufts of bristles in the central brush head.

5. A toothbrush in accordance with claim 1 wherein the bristle ends of the tufts of bristles in the first side brush head and the bristle ends of the tufts of bristles in the second side brush head face each other above the tufts of bristles of the central brush head.

6. A toothbrush in accordance with claim 1 wherein the central brush head, the first side brush head and the second side brush head are adapted to move independently from one another.

7. A toothbrush in accordance with claim 6 wherein the central brush head is adapted to move in a plane perpendicular to the plane of the bristle ends of the central brush head, the first side brush head is adapted to move in a plane parallel to the plane of the bristle ends of the central brush head, and the second side brush head is adapted to move in a plane parallel to the plane of the bristle ends of the central brush head.

8. A self-adjusting three-head toothbrush comprising:
(a) a handle having a connecting end;
(b) a central brush head having (i) a central brush head portion having a plurality of recesses formed therein for receiving tufts of bristles, (ii) tufts of bristles, each tuft having an anchor fixed in the recesses of the central brush head portion and bristle ends lying in a plane substantially parallel to the central brush head portion, and (iii) an elongated arm extending longitudinally from said central brush head portion and terminating in a connecting end;

(c) a first side brush head having (i) a first side brush enlarged head portion having a plurality of recesses formed therein for receiving tufts of bristles, (ii) tufts of bristles, each tuft having an anchor fixed in the recesses of the first side brush enlarged head portion and bristle ends, and (iii) an elongated arm extending longitudinally from said first side brush enlarged head portion and terminating in a connecting end;

(d) a second side brush head having (i) a second side brush enlarged head portion having a plurality of recesses formed therein for receiving tufts of bristles, (ii) tufts of bristles, each tuft having an anchor fixed in the recesses of the second side brush enlarged head portion and bristle ends, and (iii) an elongated arm extending longitudinally from said second side brush enlarged head portion and terminating in a connecting end;

wherein (i) said first side brush head and said second side brush head are positioned on opposite sides of said central brush head, (ii) said connecting end of the elongated arm of the central brush head is integrally connected to the connecting end of the handle, (iii) said connecting end of the elongated arm of the first side brush head and said connecting end of the elongated arm of the second side brush head are both connected to the connecting end of the handle on opposite sides of the elongated arm of the central brush head, (iv) the elongated arms of the first side brush head and the second side brush head lie parallel to and against opposite sides of the elongated arm of the central brush head, and (v) said bristle ends of the first side brush head and said bristle ends of the second side brush head lie in a plane substantially perpendicular to the plane of the bristle ends of the central brush head, (vi) the first side brush enlarged head portion and the second side brush enlarged head portion are both positioned at a predetermined angle with respect to the central brush head portion, said predetermined angle being the acute angle between (1) a plane perpendicular to the plane of the bristle ends of the central brush head and (2) a plane parallel to the respective first side brush enlarged head portion or second side brush enlarged head portion, wherein said predetermined angle is within the range of 15 to 40 degrees, (vii) the tufts of bristles in the first side brush head and in the second side brush head are longer than the tufts of bristles in the central brush head, (viii) the bristle ends of the tufts of bristles in the first side brush head and the bristle ends of the tufts of bristles in the second side brush head face each other above the tufts of bristles of the central brush head, and (ix) the central brush head is adapted to move in a plane perpendicular to the plane of the bristle ends of the central brush head, the first side brush head is adapted to move in a plane parallel to the plane of the bristle ends of the central brush head, and the second side brush head is adapted to move in a plane parallel to the plane of the bristle ends of the central brush head.

* * * * *